United States Patent
Schneider

(10) Patent No.: US 8,621,027 B2
(45) Date of Patent: Dec. 31, 2013

(54) AUTOMATICALLY PROVIDING IDENTITY INFORMATION FOR A NETWORK APPLIANCE

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 905 days.

(21) Appl. No.: 11/985,669

(22) Filed: Nov. 16, 2007

(65) Prior Publication Data

US 2009/0132681 A1 May 21, 2009

(51) Int. Cl.
*G06F 15/16* (2006.01)
*G06F 15/173* (2006.01)

(52) U.S. Cl.
USPC .......................... 709/208; 709/219; 709/222

(58) Field of Classification Search
USPC ............... 709/208, 217–219, 220–222, 224; 713/175; 716/2, 5
See application file for complete search history.

(56) References Cited

U.S. PATENT DOCUMENTS

| | | | |
|---|---|---|---|
| 5,872,966 A | 2/1999 | Burg | |
| 6,144,965 A | 11/2000 | Oliver | |
| 6,212,563 B1 | 4/2001 | Beser | |
| 6,721,733 B2 | 4/2004 | Lipson et al. | |
| 6,847,959 B1 | 1/2005 | Arrouye et al. | |
| 6,996,832 B2 | 2/2006 | Gunduc et al. | |
| 7,003,527 B1 | 2/2006 | Lavallee et al. | |
| 7,254,814 B1 | 8/2007 | Cormier et al. | |
| 7,509,638 B2 | 3/2009 | Backhouse et al. | |
| 7,568,095 B2 | 7/2009 | Thornton et al. | |
| 7,650,397 B2 | 1/2010 | Price et al. | |
| 7,673,143 B1 | 3/2010 | Yeager et al. | |
| 7,702,902 B2 | 4/2010 | Thayer et al. | |
| 7,707,405 B1* | 4/2010 | Gilman et al. | ................ 713/156 |
| 8,191,122 B2 | 5/2012 | Schneider | |
| 8,191,123 B2 | 5/2012 | Schneider | |
| 2001/0028647 A1 | 10/2001 | Teraoka | |
| 2002/0116453 A1 | 8/2002 | Todorov et al. | |
| 2003/0037237 A1 | 2/2003 | Abgrall et al. | |
| 2003/0158957 A1* | 8/2003 | Abdolsalehi | ................ 709/231 |
| 2004/0068586 A1 | 4/2004 | Xie et al. | |
| 2004/0093499 A1 | 5/2004 | Arditi et al. | |
| 2004/0148185 A1 | 7/2004 | Sadiq | |
| 2005/0033794 A1 | 2/2005 | Aridor et al. | |
| 2005/0125411 A1 | 6/2005 | Killian et al. | |
| 2005/0235352 A1* | 10/2005 | Staats et al. | .................... 726/14 |
| 2005/0289084 A1 | 12/2005 | Thayer et al. | |
| 2006/0004689 A1 | 1/2006 | Chandrasekaran et al. | |
| 2006/0059111 A1* | 3/2006 | Tucker et al. | ................... 705/75 |
| 2006/0074975 A1 | 4/2006 | Tunar et al. | |
| 2007/0074119 A1* | 3/2007 | Komine et al. | ............... 715/743 |

(Continued)

OTHER PUBLICATIONS

Dubash, Manek, Techworld.com, Yahoo News, PC World.com, Red Hat Posts Command Center, May 29, 2007, 1 page.

(Continued)

*Primary Examiner* — Ruolei Zong
(74) *Attorney, Agent, or Firm* — Lowenstein Sandler LLP

(57) ABSTRACT

A method and system for activating a network appliance. The method may include providing a user interface for a network appliance, and allowing a user to request an activation of the network appliance via the user interface, without requiring the user to specify the identity of the network appliance. The method may further include sending an activation request to a server, receiving a response triggering an activation process on the network appliance from the server, and performing the activation process on the network appliance.

18 Claims, 4 Drawing Sheets

(56) References Cited

U.S. PATENT DOCUMENTS

| | | | |
|---|---|---|---|
| 2007/0100965 A1* | 5/2007 | Schweier | 709/218 |
| 2008/0004887 A1 | 1/2008 | Brunswig et al. | |
| 2008/0022103 A1* | 1/2008 | Brown et al. | 713/175 |
| 2008/0071796 A1 | 3/2008 | Ghuneim et al. | |
| 2008/0092234 A1 | 4/2008 | Circenis | |
| 2008/0114770 A1 | 5/2008 | Chen et al. | |
| 2008/0189651 A1 | 8/2008 | Reveman | |
| 2008/0235710 A1 | 9/2008 | Challenger et al. | |
| 2008/0307508 A1 | 12/2008 | Conley et al. | |
| 2009/0031410 A1 | 1/2009 | Schneider et al. | |
| 2009/0064127 A1 | 3/2009 | Schneider | |
| 2009/0100512 A1 | 4/2009 | Schneider | |
| 2009/0138946 A1 | 5/2009 | Schneider et al. | |
| 2009/0138947 A1 | 5/2009 | Schneider et al. | |
| 2009/0144399 A1 | 6/2009 | Schneider | |

OTHER PUBLICATIONS

Red Hat, Red Hat Command Center, Easy effective, affordable systems monitoring, www.redhat.com, 2007, 2 pages.
Office Action of U.S. Appl. No. 11/880,806 mailed Oct. 13, 2010.
Office Action of U.S. Appl. No. 11/880,806 mailed Mar. 21, 2011.
Office Action of U.S. Appl. No. 11/880,806 mailed Jul. 25, 2011.
Office Action of U.S. Appl. No. 11/998,098 mailed Mar. 24, 2011.
Office Action of U.S. Appl. No. 11/998,098 mailed Aug. 4, 2011.
Notice of Allowance of U.S. Appl. No. 11/998,098 mailed Nov. 28, 2011.
Office Action of U.S. Appl. No. 11/998,097 mailed Aug. 3, 2011.
Office Action of U.S. Appl. No. 11/998,097 mailed Mar. 24, 2011.
Notice of Allowance of U.S. Appl. No. 11/998,097 mailed Jan. 3, 2012.
Red Hat, Inc., "Red Hat Command Center: User Guide 3.18," 2007, 318 pages.
Red Hat, Inc., "Red Hat Command Center 3.18: Check Reference," 2007, 178 pages.
Red Hat, Inc., "Red Hat Command Center 3.18: Setup and Installation Guide," 2007, 33 pages.
Red Hat, Inc., "Red Hat Command Center 3.18: Release Notes," 2007, 7 pages.
Woods, Will. "git://git.fedorahosted.org/snake/committdiff", http://git.fedorahosted.org/git/snake?p;=snake;a=committdiff;h=a2cb4fcae9531e22d2fa3d... Aug. 22, 2007, 2 pages.
Kaufman, et al., "Network Security: Private Communication in a Public World," 2nd Edition, Prentice Hall Series in Computer Networking and Distributed Systems, 2002, pp. 311-313, ISBN: 0-13-046019-2.

* cited by examiner

AUTOMATICALLY PROVIDING IDENTITY INFORMATION FOR A NETWORK APPLIANCE

TECHNICAL FIELD

1Embodiments of the present invention relate to network appliances, and more specifically to automatically providing identity information for a network appliance.

BACKGROUND

A network appliance may be a computing device (e.g., a desktop computer, laptop computer, a router, etc.) that communicates with a server via a network. To ensure privacy and security during communication between the network appliance and the server, authentication and verification mechanisms may be used. One such mechanism is known as a public key infrastructure system.

In a public key infrastructure system, a network appliance may send a certificate signing request (CSR) to a certificate authority in order to apply for a signed identity certificate. Before creating a CSR, the network appliance may first generate a key pair (including a public key and a private key), keeping the private key secret. The CSR may contain information identifying the network appliance (e.g., its distinguished name in the case of an X.509 certificate), and the public key generated by the network appliance. If the request is successful (e.g., if the identifying information, credentials and proofs of identity are satisfactory), the certificate authority will send back an identity certificate (also known as a digital certificate, signed certificate, public key certificate, etc.) that has been digitally signed with the private key of the certificate authority. This identity certificate may then used by the network appliance to authenticate itself to the server and other networked devices that trust the certificate authority.

The identity certificate is often generated as part of activating a new network appliance. In particular, when a user wants to activate a network appliance, the user identifies the network appliance to a back end server, which then triggers the activation of the network appliance upon verifying the identity of the network appliance. If the network appliance identity provided by the user is incorrect, the activation process does not take place.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
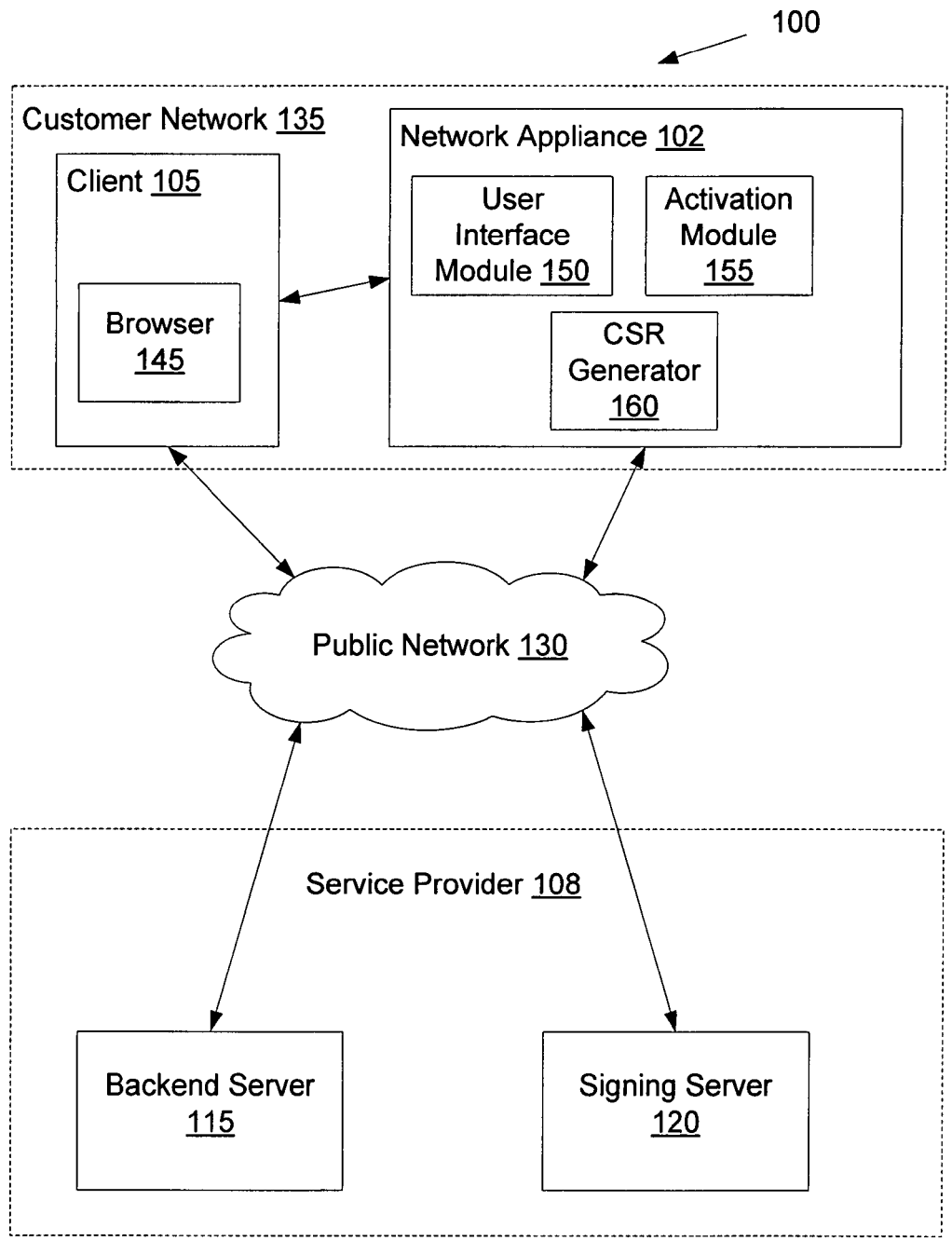
FIG. 1 illustrates an exemplary network architecture in which embodiments of the invention may operate.

Described herein is a method and system for activating a network appliance. In one embodiment, a user interface is provided that allows a user to request the activation of a network appliance without requiring the user to specify the identity of the network appliance. For example, the user interface may include a link (e.g., "provision" link). When the user selects this link, an activation request is generated and sent to the back end server. The activation request indicates the identity of the network appliance. The back end server verifies the identity of the network appliance and sends a response back to the network appliance. Upon receiving the response from the back end server, the network appliance performs the activation process, and then notifies the back end server when the activation process is completed.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention may be provided as a computer program product, or software, that may include a machine-readable storage medium having stored thereon instructions, which may be used to program a computer system (or other electronic devices) to perform a process according to the present invention. A machine-readable storage medium includes any mechanism for storing or transmitting information in a form readable by a machine (e.g., a computer). For example, a machine-readable storage medium (e.g., computer-readable storage medium) includes read only memory ("ROM"), random access memory ("RAM"), magnetic disk storage media, optical storage media, and flash memory devices, etc.

Unless specifically stated otherwise as apparent from the following discussion, it is appreciated that throughout the description, discussions utilizing terms such as "processing" or "generating" or "calculating" or "determining" or "transmitting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates an exemplary network architecture 100 in which embodiments of the present invention may operate.

The network architecture 100 may include a service provider 108 connected with a network appliance 102 via a network 106 (e.g., a public network such as Internet or a private network such as Intranet or a virtual private network (VPN)). The network appliance 102 may be part of a customer network 135 (e.g., a local area network (LAN), wide area network (WAN), etc.) that may be a network of an enterprise and may include such devices as desktop computers, laptop computers, network printers, switches, routers, gateways, firewalls, or any other devices having a network address. The network appliance 102 may be a computing device (e.g., a desktop computer, a laptop computer, a router, etc.) that is configured to perform a network related function such as monitoring of the customer network, collecting operational characteristics of devices on the customer network, etc. In one embodiment, the customer network 135 also includes a client device 105 coupled to the network appliance 102. The client 105 may be operated by an IT administrator or some other user to view and/or enter data related to the network appliance 102.

The service provider 108 may receive information provided by the network appliance 102, analyze this information, and provide alerts and various reports to an administrator of the customer network. Alternatively, the network appliance 102 may collect other types of data, and the service provider 140 may use the network appliance 102 to provide other services, such as database management, etc. Yet alternatively, the network appliance 102 may be configured to perform indexing of local network resources, and the service provider 108 may receive index data from the network appliance, store the index data in a data store and/or use the index data for the operation of its search engine.

In one embodiment, the functionality of the network appliance 102 is automatically initiated upon completion of an activation process. A user request for activation of the network appliance 110 may originate from the client 105. For example, the user may access a user interface provided by the network appliance via a browser 145 hosted by the client 105. Alternatively, the user request for activation of the network appliance 110 may originate from the network appliance itself (e.g., the user may log in to the network appliance UI directly or via a browser hosted by the network appliance 102). The activation process (also known as provisioning) may include obtaining an identity certificate (also known as a digital certificate, signed certificate, public key certificate, client x.509 certificate, etc.) for the network appliance 102 and configuring the network appliance 102 based on configuration information provided by the service provider 108.

In one embodiment, the network appliance 102 hosts a user interface module 150 that provides a user interface (UI) allowing a user to request the activation of the network appliance 102. The user may access this UI via the browser 145 hosted by the client 105 or directly from the network appliance 102. The UI provided by the user interface module 150 may include a link, which when selected by a user, causes an activation request to be generated and to be sent to a back end server 115 of the service provider 108. The back end server 115 examines the activation request to determine the identity of the network appliance to be activated. The identity may be in the form of an IP address of the network appliance. The back end server 115 then uses the identity of the network appliance to verify whether the network appliance is a valid device. If so, the back end server 115 generates a response that triggers the activation process on the network appliance 102. In one embodiment, the response of the back end server 115 includes a network appliance ID and a transaction ID. The network appliance ID is generated by the back end server 115 to uniquely identify the network appliance 102. The transaction ID is generated by the back end server 115 to uniquely identify the transaction associated with the activation of the network appliance 102.

When the network appliance 102 receives the response from the service provider 108, it invokes the activation module 155 to perform the activation of the network appliance 102. The activation module 155 obtains the identity certificate for the network appliance 102 and configures the network appliance 102

The identity certificate may be obtained using a CSR generator 160 that generates a certificate signing request (CSR), sends the CSR to a singing server 120 (a certificate authority hosted by the service provider 108), and receives a valid identity certificate from the signing server 120. The CSR may be generated using a public key pair (a public key and a private key) generated by the network appliance 102. In particular, the CSR may include the public key bundled with additional information such as credentials and the network appliance ID, with the bundle being signed by the private key.

The network appliance 102 stores the identity certificate 118 in a local data store to use it for secure communication with the service provider 108 and other entities that trust the signing server 110. In particular, the network appliance 102 may use the identity certificate 118 to establish a secure connection with the service provider 108 for receiving configuration information from the service provider 108. The configuration information may be provided to the network appliance 102 by the back-end server 112 that may communicate with the network appliance 102 directly or via an https proxy.

It should be noted that the servers 115 and 120 may share the same machine or be hosted by two or more independent machines. In addition, the servers 115 and 120 may reside externally to the service provider 108.

Figure 2:
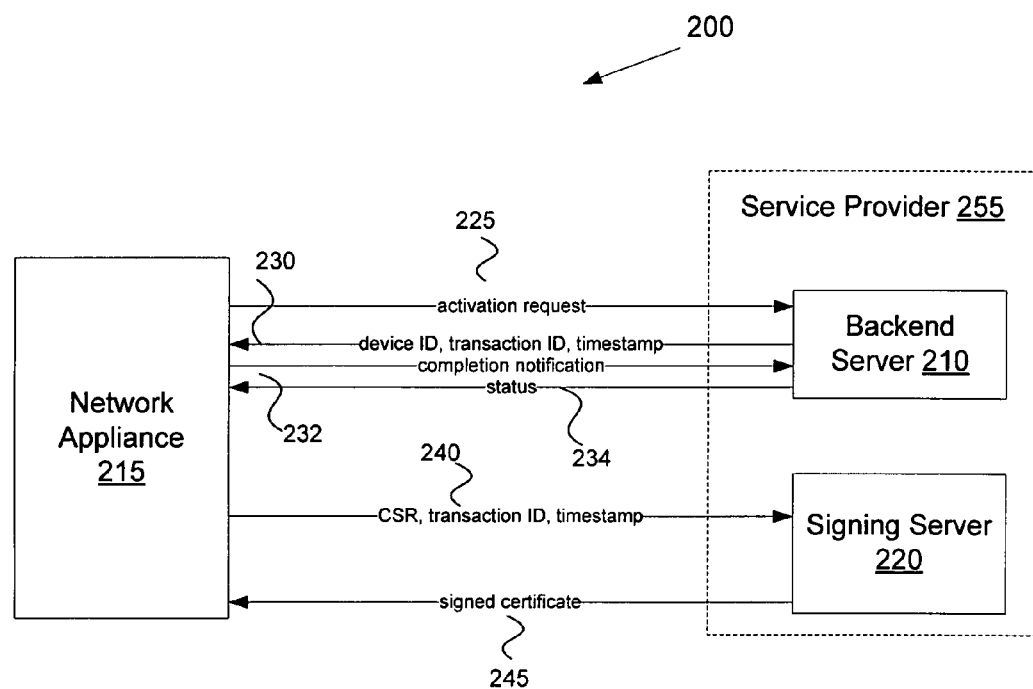
FIG. 2 illustrates an exemplary data flow diagram that shows data transmissions associated with a network appliance, in accordance with one embodiment of the invention.

FIG. 2 illustrates an exemplary data flow diagram 200 that shows data transmissions associated with a network appliance. The data flow diagram 200 shows data transmitted between a network appliance 215 and a service provider 255, in accordance with one embodiment of the present invention. Each transmission may preferably be achieved using a secure channel such as, for example, secure sockets layer (SSL), secure hypertext transfer protocol (HTTPS), etc. Alternatively, an unsecure channel may be used for transmission of, for example, an identity certificate.

Initially, a user (e.g., in IT administrator) logs in to a UI provided by the network appliance 215. The login can be accomplished via a browser hosted by a client coupled to the network appliance 215 or via a browser hosted by the network appliance 215. In response to the login, the user is presented with an admin page of the network appliance UI. The admin page includes a provision link that targets the back end server 210. When the user selects the provision link, an activation request 225 is generated and sent to the back end server 210. The activation request 225 indicates the identity of the network appliance 215. The identity may be represented by the IP address of the network appliance 214. The IP address may be included in the activation request by the browser that obtains this information when downloading the admin page of the network appliance UI. Alternatively, the "Referer:" header included in the activation request may be enabled to allow the back end server 210 to extract the IP address of the network appliance 215.

The back end server 210 generates a unique ID of the network appliance 215 and a transaction ID for the activation process, and sends a response 230 (including the network appliance ID, the transaction ID and the current timestamp) to the network appliance 215. The network appliance 215 receives the response 230 and performs the activation process. In one embodiment, the back end server 210 sends the response 230 by generating a redirect back to the network appliance 215. The browser acts on the redirect of the back end server 210 to request the activation page from the network appliance 215.

Upon completing the activation, the network appliance 215 sends a notification 232 to the back end server 210, which then returns a status 234 to be viewed by the user. In one embodiment, the network appliance 215 sends the notification 232 by redirecting the browser to a status page on the back end server 210. The browser then receives the status page from the back end server 210 and displays it to the user.

Subsequently, the network appliance 215 sends a CSR 240 to a signing server 220 and receives the signed certificate 245 back from the signing server 220. The network appliance 215 then uses the certificate 245 to obtain configuration information from the back-end server 210.

Figure 3:
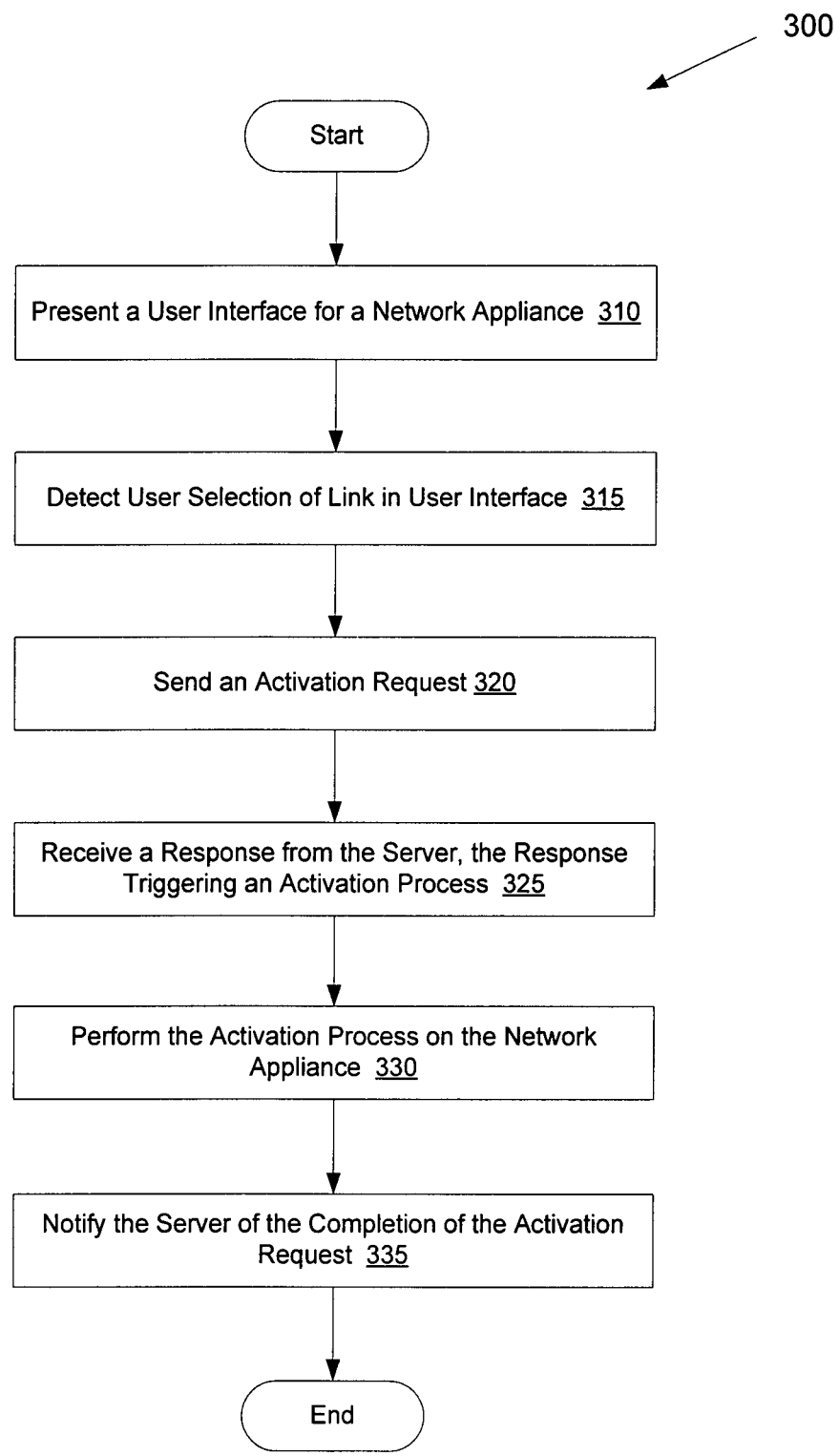
FIG. 3 is a flow diagram of one embodiment of a method for activating a network appliance.

FIG. 3 is a flow diagram illustrating one embodiment of a method 300 for activating a network appliance. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a network appliance, such as a network appliance 102 of FIG. 1.

Referring to FIG. 3, method 300 begins with processing logic presenting a user interface for a network appliance (block 310). The user interface includes a provision link that allows a user to request the activation of the network appliance without specifying the identity of the network appliance.

At block 315, processing logic detects the selection of the provision link by the user. In response, processing logic generates an activation request and sends it to a server such as a back end server 115 (block 320). The activation request indicates the identity of the network appliance. In particular, the identity information (e.g., IP address) may be obtained when presenting the UI provided by the network appliance and may be included in the activation request. Alternatively, the "Referer:" header included in the activation request may be enabled to allow the server to extract the IP address of the network appliance.

Accordingly, the identity information is provided to the server automatically, without requiring the user to know and/or enter the identity information or any portion of it.

At block 325, processing logic receives a response from the server. The response may include the network appliance ID generated by the server, the transaction ID generated by the server and the current timestamp. The response triggers the activation process that is performed at block 330. When the activation process is completed, processing logic sends a notification to the server (block 335).

Figure 4:
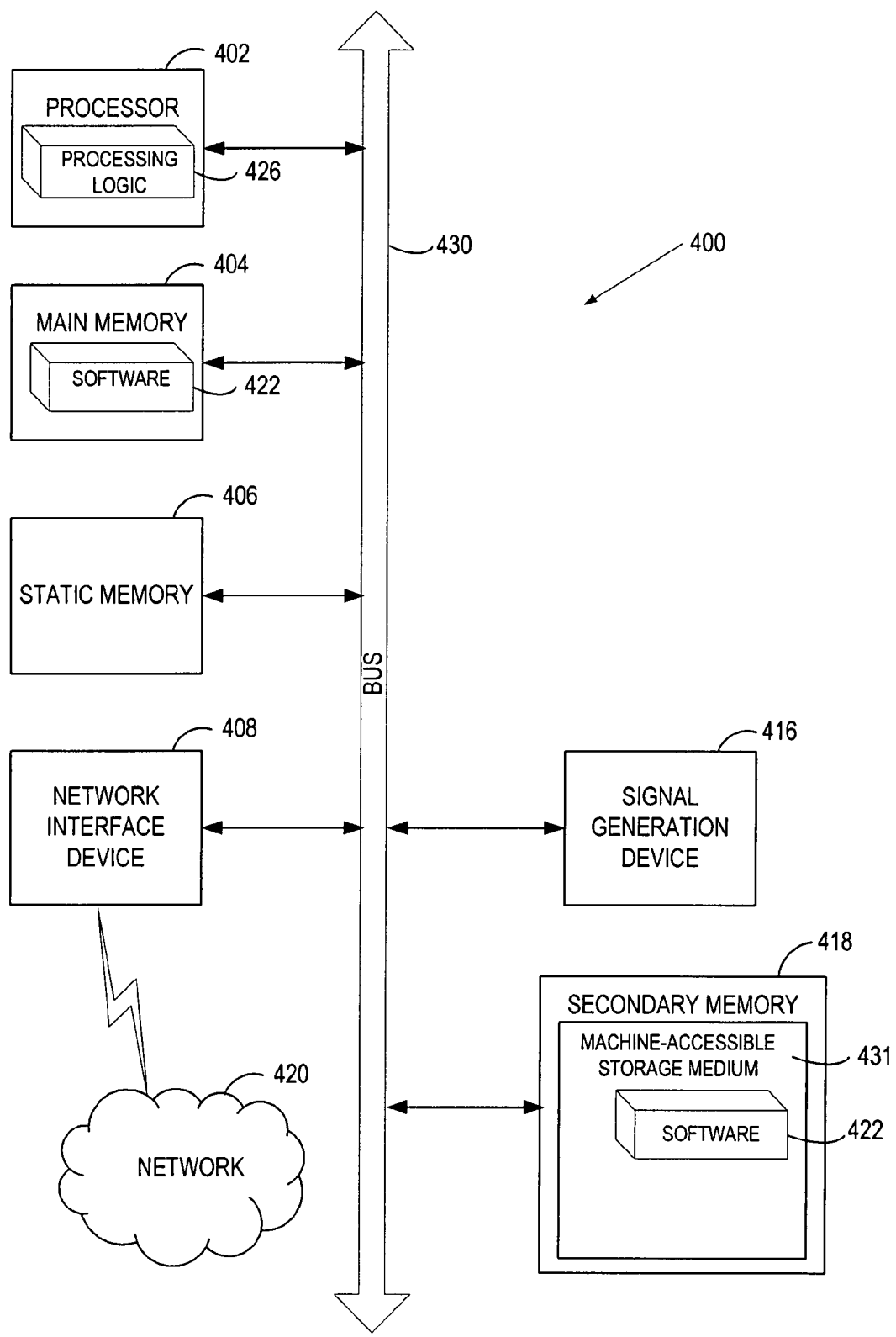
FIG. 4 illustrates a diagrammatic representation of a machine in the exemplary form of a computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. The machine may be connected (e.g., networked) to other machines in a LAN, an intranet, an extranet, or the Internet. The machine may operate in a client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The machine may be a server, a personal computer, a mobile device, or any other device and may represent, for example, a server 115 or 120, a client 105, a network appliance 102, or any other computing device.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), and a static memory 406 (e.g., flash memory, static random access memory (SRAM), etc.), which may communicate with each other via a bus 430. Alternatively, the processing device 402 may be connected to memory 404 and/or 406 directly or via some other connectivity means.

Processing device 402 represents one or more general-purpose processing devices such as a microprocessor, central processing unit, or the like. More particularly, the processing device 402 may be complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 402 is configured to execute processing logic 426 for performing the operations and steps discussed herein.

The computer system 400 may further include a network interface device 408 and/or a signal generation device 416. It also may or may not include a video display unit (e.g., a liquid crystal display (LCD) or a cathode ray tube (CRT)), an alphanumeric input device (e.g., a keyboard), and/or a cursor control device (e.g., a mouse).

The computer system 400 may or may not include a secondary memory 418 (e.g., a data storage device) having a machine-readable storage medium 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
providing a user interface for a network appliance, the network appliance comprising a processing device;
allowing a user to request an activation of the network appliance by providing a link to request the activation via the user interface to initiate monitoring of performance of a device on a local network by the network appliance, without requiring the user to specify data pertaining to an identity of the network appliance, wherein the link is associated with the identity of the network appliance;
sending an activation request to a server, wherein the activation request comprises the identity of the network appliance and wherein the identity of the network appliance comprises an IP address of the network appliance;
receiving, by the network appliance, a response from the server, the response triggering an activation process on the network appliance; and
performing the activation process on the network appliance.

2. The method of claim 1, further comprising:
detecting a user activation of the link.

3. The method of claim 1, further comprising:
detecting a user activation of the link; and
enabling a referer header to be sent in the activation request to allow the server to extract the identity of the network appliance from the referer header, the identity being an IP address of the network appliance.

4. The method of claim 1, wherein the response is a web page redirect to request an activation web page.

5. The method of claim 1, wherein the response from the server includes a network appliance identifier and a transaction identifier for a transaction associated with the activation request.

6. The method of claim 1, wherein performing the activation process on the network appliance comprises:
transmitting a certificate signing request (CSR) and a transaction identifier from the network appliance to the server; and
receiving a certificate from the server at the network appliance if the activation is valid.

7. The method of claim 1, further comprising notifying the server of a completion of the activation process, wherein notifying the server comprises sending, by the network appliance, a redirect to a status web page on the server.

8. A non-transitory computer readable storage medium comprising executable instructions which when executed by a processing device cause said processing device to perform operations comprising:
providing a user interface for a network appliance, the network appliance comprising a processing device;
allowing a user to request an activation of the network appliance by providing a link to request the activation via the user interface to initiate monitoring of performance of a device on a local network by the network appliance, without requiring the user to specify data pertaining to an identity of the network appliance, wherein the link is associated with the identity of the network appliance;
sending an activation request to a server, wherein the activation request comprises the identity of the network appliance and wherein the identity of the network appliance comprises an IP address of the network appliance;
receiving, by the network appliance, a response from the server, the response triggering an activation process on the network appliance; and
performing the activation process on the network appliance.

9. The non-transitory computer readable storage medium of claim 8, the operations further comprising:
detecting a user activation of the link.

10. The non-transitory computer readable storage medium of claim 8, the operations further comprising:
detecting a user activation of the link; and
enabling a referer header to be sent in the activation request to allow the server to extract the identity of the network appliance from the referer header, the identity being an IP address of the network appliance.

11. The non-transitory computer readable storage medium of claim 8, wherein the response is a web page redirect to request an activation web page.

12. The non-transitory computer readable storage medium of claim 8, wherein the response from the server includes a network appliance identifier and a transaction identifier for a transaction associated with the activation request.

13. The non-transitory computer readable storage medium of claim 8, wherein performing the activation process on the network appliance comprises:
transmitting a certificate signing request (CSR) and a transaction identifier from the network appliance to the server; and
receiving a certificate from the server at the network appliance if the activation is valid.

14. The non-transitory computer readable storage medium of claim 8, the operations further comprising notifying the server of a completion of the activation process, wherein notifying the server comprises sending, by the network appliance, a redirect to a status web page on the server.

15. A computing system comprising:
a memory to store instructions for a network appliance; and
a processing device, connected to the memory, to execute the instructions, wherein the instructions cause the processing device to:
provide a user interface for the network appliance, the network appliance comprising a processing device,
allow a user to request an activation of the network appliance to initiate monitoring of performance of a device on the network appliance by providing a link to request the activation via the user interface, without requiring the user to specify data pertaining to an identity of the network appliance, wherein the link is associated with the identity of the network appliance, and
send an activation request to a server, wherein the activation request comprises the identity of the network appliance and wherein the identity of the network appliance comprises an IP address of the network appliance,
receive a response from the server, the response triggering an activation process on the network appliance, and perform the activation process on the network appliance.

16. The computing system of claim 15, wherein the processing device is further to send a status response to the server.

17. The computing system of claim 15, wherein the processing device is further to detect a user activation of the link, and to include an IP address of the network appliance associated with the link in the activation request upon detecting a user activation of the link.

18. The computing system of claim 15, wherein the processing device is further to detect a user activation of the link, and to enable a referer header to be sent in the activation request to allow the server to extract location of the network appliance from the referer header.

* * * * *

UNITED STATES PATENT AND TRADEMARK OFFICE
CERTIFICATE OF CORRECTION

PATENT NO. : 8,621,027 B2  
APPLICATION NO. : 11/985669  
DATED : December 31, 2013  
INVENTOR(S) : James P. Schneider Page 1 of 1

It is certified that error appears in the above-identified patent and that said Letters Patent is hereby corrected as shown below:

In the Claims

In claim 15, column 8, line 36, delete "appliance ," and insert --appliance,--

Signed and Sealed this  
Eleventh Day of November, 2014

Michelle K. Lee  
*Deputy Director of the United States Patent and Trademark Office*